(12) United States Patent
Sungkhaphong et al.

(10) Patent No.: US 9,333,604 B1
(45) Date of Patent: May 10, 2016

(54) MANUALLY ADJUSTABLE BRACKET FOR USE WITH A FASTENER MECHANISM

(75) Inventors: Komgrit Sungkhaphong, Klongsaamwa (TH); Yuranan Rattanaphanna, Bangkok (TH)

(73) Assignee: Western Digital Technologies, Inc., Irvine, CA (US)

( * ) Notice: Subject to any disclaimer, the term of this patent is extended or adjusted under 35 U.S.C. 154(b) by 911 days.

(21) Appl. No.: 13/553,620

(22) Filed: Jul. 19, 2012

(51) Int. Cl.
*B23P 19/06* (2006.01)

(52) U.S. Cl.
CPC ............ *B23P 19/06* (2013.01); *Y10T 29/49025* (2015.01)

(58) Field of Classification Search
CPC ..... B23B 21/002; B23B 21/00; B23P 19/007; B23P 19/06; B23P 19/10; E02D 7/16
USPC ..................... 248/226.11, 660, 674
See application file for complete search history.

(56) References Cited

U.S. PATENT DOCUMENTS

| | | | | |
|---|---|---|---|---|
| 3,298,098 A * | 1/1967 | Gleisner, Jr. | ....... | B23Q 3/15706 483/47 |
| 3,581,354 A * | 6/1971 | Usiskin | ................ | G01B 5/0002 24/569 |
| 4,561,506 A * | 12/1985 | Booker | .................... | B25J 9/146 173/190 |
| 4,583,909 A * | 4/1986 | Yamashita | ............... | B23Q 1/58 403/400 |
| 4,701,100 A * | 10/1987 | Nagai | ..................... | B25J 9/023 104/134 |
| 4,878,644 A * | 11/1989 | Downing | .................. | B25F 3/00 248/229.24 |
| 4,896,857 A * | 1/1990 | McCullough | ........ | G01B 5/0002 248/279.1 |
| 5,060,533 A * | 10/1991 | Torii | ..................... | B25J 9/0009 403/164 |
| 5,931,428 A * | 8/1999 | Ikeda | ................... | G01B 5/0002 248/230.1 |
| 6,266,869 B1 * | 7/2001 | Tracy | .................. | G11B 5/4826 29/740 |
| 6,779,252 B2 * | 8/2004 | Tracy | .................. | G11B 5/4826 29/603.03 |
| 7,328,518 B2 * | 2/2008 | Taniuchi | ................. | G01B 5/28 33/551 |
| 7,549,204 B1 * | 6/2009 | Vangal-Ramamurthy et al. | ..................... | B23P 19/007 29/407.02 |
| 8,074,348 B2 | 12/2011 | Haytayan | | |
| 8,561,285 B1 * | 10/2013 | Vangal-Ramamurthy et al. | ..................... | B23P 19/007 29/603.03 |
| 2004/0064931 A1 * | 4/2004 | Albrecht | ................. | B23P 19/06 29/428 |

* cited by examiner

*Primary Examiner* — Andrew M Tecco

(57) ABSTRACT

Disclosed is a manually adjustable bracket moveable in first and second directions that is attached to a fastener mechanism for use in a fastener assembly station. An actuator moves the manually adjustable bracket and the fastener mechanism in a third direction to fasten fasteners to a work product. The manually adjustable bracket comprises: a first linear guideway configured for manual movement in the first direction and configured to be attached to the actuator; and a second linear guideway coupled to the first linear guideway and configured for manual movement in the second direction and configured to be attached to the fastener mechanism. The first and second linear guideways are configured to be manually moved to a desired location and locked such that the fastener mechanism is locked into the desired location to be moved by the actuator in the third direction for fastening fasteners to the work product.

8 Claims, 3 Drawing Sheets

MANUALLY ADJUSTABLE BRACKET FOR USE WITH A FASTENER MECHANISM

BACKGROUND

During the manufacturing of devices (e.g., mechanical, electromechanical, and electrical devices), an assembly device is often utilized to drive a component (e.g., such as a fastener) into the device being assembled in order to connect together components of the device. Examples of fasteners may include: screws, bolts, rivets, plugs, etc.; which are used to connect together components of the device being manufactured. Fastener mechanisms (e.g., such as automated screw drivers) are often used in large volume device manufacturing. In particular, fastener mechanisms are commonly used in high-tech device manufacturing.

Due to the complexity of high-tech devices and the cost competitiveness of the high-tech industry, the components of high-tech devices need to be assembled in a precise and time effective manner. Examples of high-tech devices include: disk drives, storage devices, computing devices, personal computers, laptop computers, server computers, mobile computers, mobile devices, wireless devices, etc. In particular, in order to be cost effective, complex components of high-tech devices need to be assembled, with fasteners, such as screws, in a very time effective and precise manner.

Further, because design changes in high-tech devices are occurring at ever increasing rates, as well as new devices coming on-line at ever increasing rates, assembly stations that utilize fastener mechanisms to assemble devices need to be highly flexible in order to adjust the positioning of the fastener mechanisms to connect together device components at different locations.

Unfortunately, many assembly stations utilize fixed-positioned fastener mechanisms, which, while cost effective, cannot adequately accommodate the ever increasing design changes that require the changing of the positions of the fastener mechanisms. On the other hand, programmable robotic-based assembly stations may be able to accommodate design changes, but they require timely and costly re-programming for the changed positioning of the fastener mechanisms. Further, programmable robotic-based assembly stations are inherently expensive.

DETAILED DESCRIPTION

Figure 1:
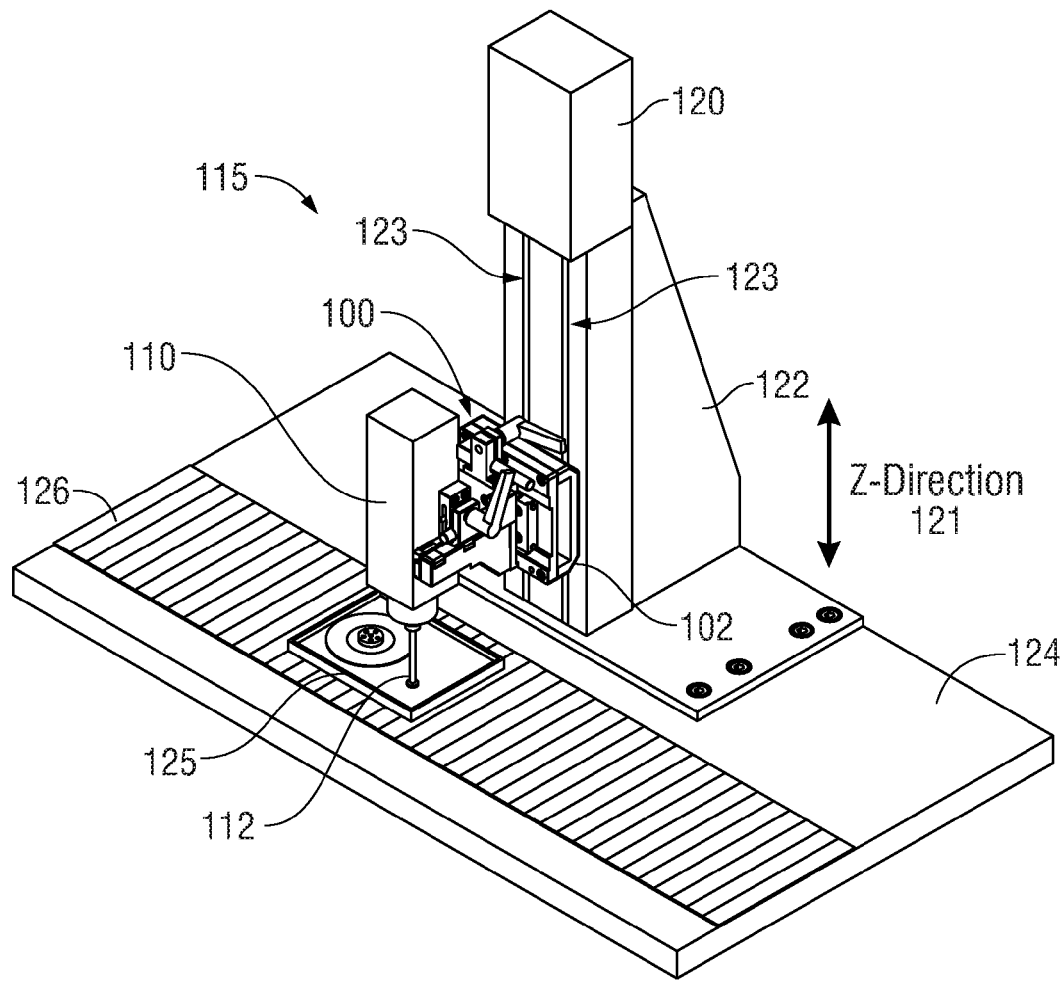
FIG. 1 is perspective view of a fastener assembly station including a vertical actuator to which a manually adjustable bracket, according to one embodiment of the invention, may be attached.
Figure 2:
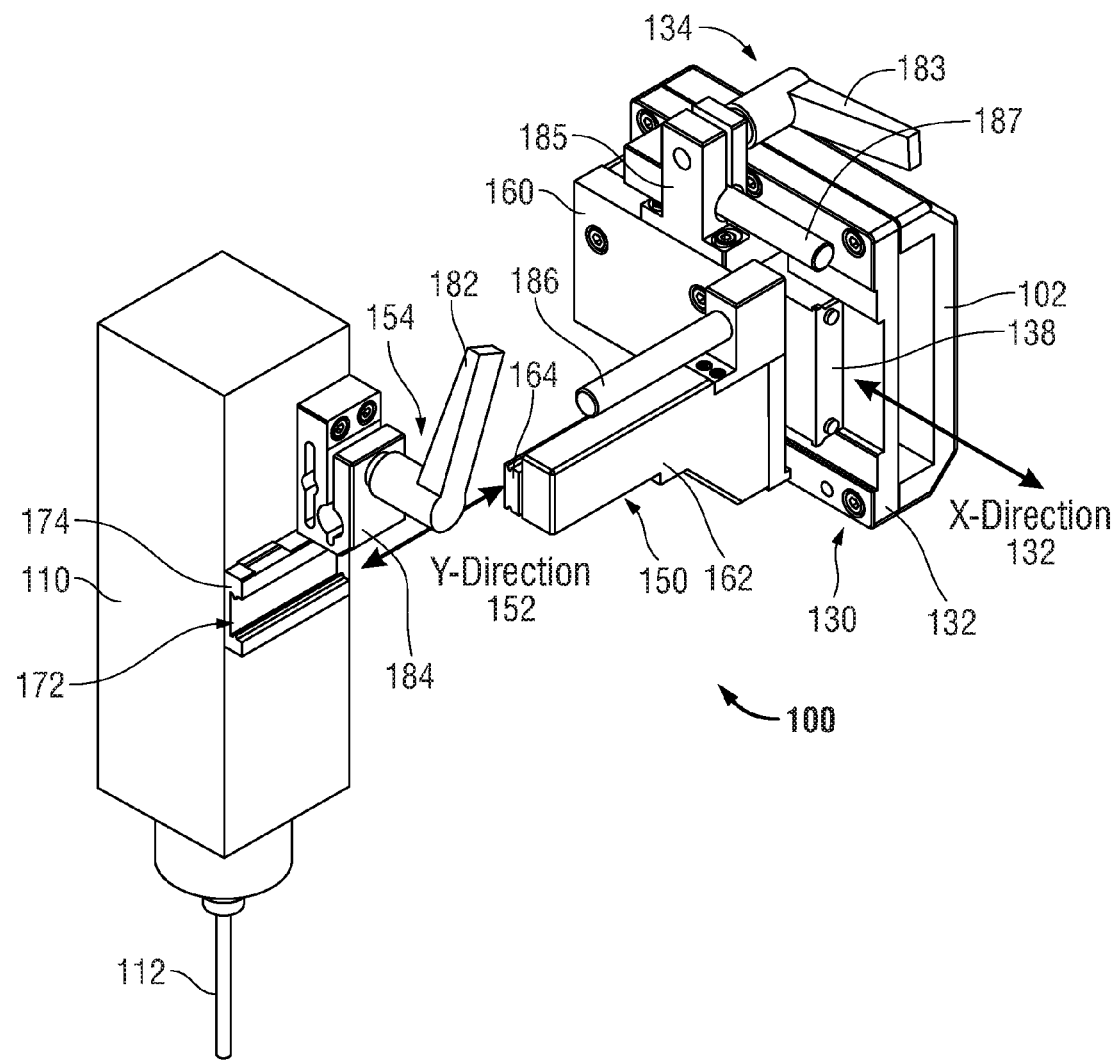
FIG. 2 is perspective view of the manually adjustable bracket, according to one embodiment of the invention, illustrating the connection of a fastener mechanism.
Figure 3:
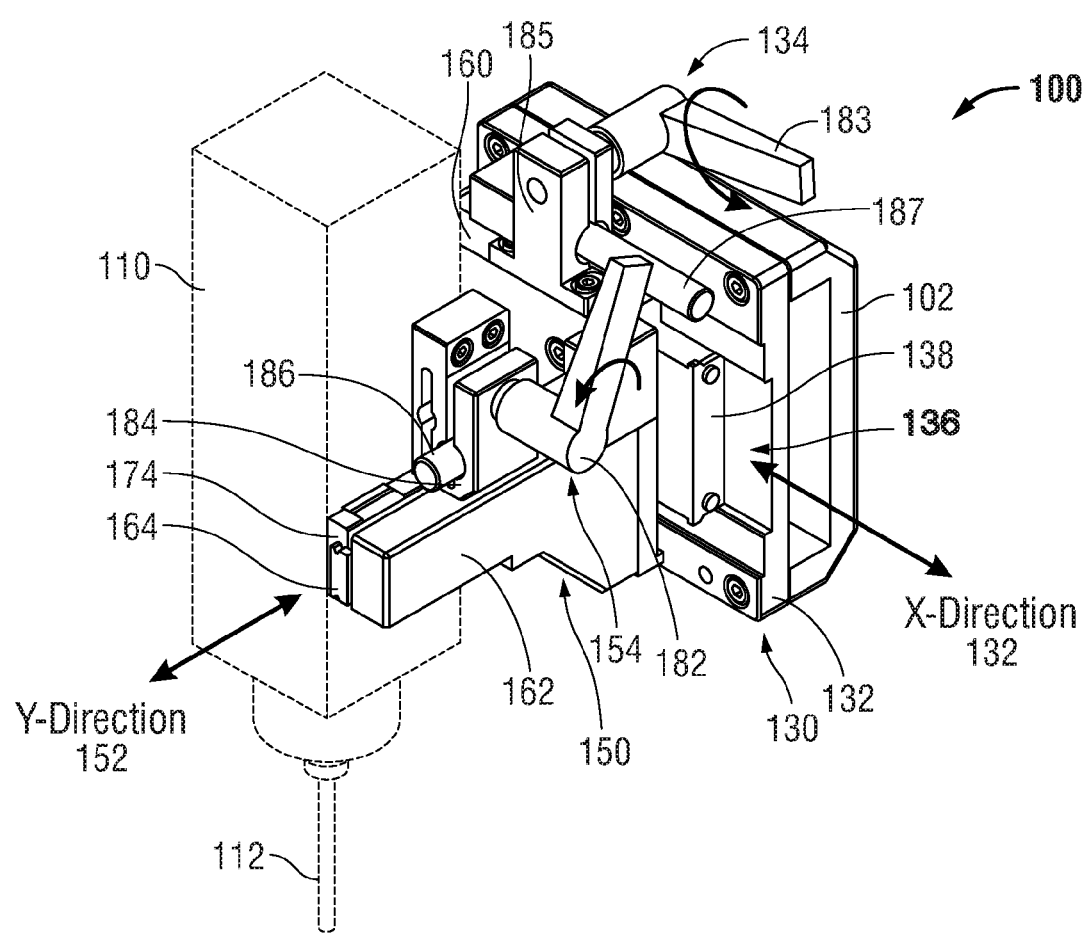
FIG. 3 is perspective view of the manually adjustable bracket with the fastener mechanism connected thereto, according to one embodiment of the invention.

With reference to FIGS. 1-3, a manually adjustable bracket 100 movable in first and second directions, according to one embodiment of the invention, will be hereinafter described. A fastener mechanism 110 may be attached to the manually adjustable bracket 100 for use in a fastener assembly station 115 that includes an actuator 120 to move the fastener mechanism 110 in a third direction to fasten fasteners to a work product 125.

As an example, actuator 120 may be a rectangular-shaped actuator that moves the manually adjustable bracket 100 and the fastener mechanism 110 in the up and down or vertical direction (e.g., the Z-axis direction 121). Vertical actuator 120 may be mounted via a support structure 122 to a base portion 124 of the fastener assembly station 115. In particular, the vertical actuator 120 may be used to move the fastener mechanism 110 in the vertical direction to fasten fasteners to the work product 125. Vertical actuator 120 may be a motorized linear actuator, a gas or air-based linear actuator, or a pneumatic linear actuator. It should be appreciated that any type of suitable linear actuator capable of moving a fastener mechanism may be utilized.

As one example, vertical actuator 120 may be a motorized vertical actuator having vertical channels 123 in which fasteners (not shown) on the back-side of an approximately U-shaped mounting portion 102 of the manually adjustable bracket 100 are mounted—such that the vertical actuator 120 can move the manually adjustable bracket 100 and the fastener mechanism 110 in the vertical direction (Z-axis direction 121) to fasten fasteners to the work product 125.

In this example, base 124 of the fastener assembly station 115 may include a conveyer belt 126 that rotates the work product 125 under the fastener mechanism 110 such that the vertical actuator 120 may move the fastener mechanism 110 in a vertical direction (Z-axis direction 121) to an appropriate position to drive a fastener into the work product 125. On the other hand, an operator may also manually move the work product 125 to the designated position, under the fastener mechanism 110, such that the fastener mechanism moves in the vertical direction to fasten appropriate fasteners into the work product.

Continuing with the example of FIG. 1, the work product 125 may be a disk drive and the fastener mechanism 110 may be an electric screw driving mechanism. As shown in this example, the electric screw driving mechanism 110 may include a rotatable shaft 112 to rotate a screw (not shown) to components of the disk drive 125 being assembled. In particular, the electric screw driving mechanism 110 may be utilized to connect together components (not shown) of the disk drive 125.

It should be appreciated that, although an electric screw driving mechanism is given as an example of a fastener mechanism 110, that any suitable type of driving or fastening mechanism to connect together components of a work product 125 may be utilized. Additionally, although a screw is given as an example of a fastener, any suitable type of fastener may be utilized, such as: a rivet, bolt, plug, etc.; which may be used to connect together components of the work product 125 being manufactured.

Moreover, although a disk drive is given as an example of a work product 125, it should be appreciated that any type of mechanical device, electromechanical device, and/or electrical device may be an example of a work product. In particular, high-tech work product devices such as: disk drives, storage devices, computing devices, mobile devices, wireless devices, etc., may be suitable work products for assembly for use with aspects of the present invention.

With additional reference to FIGS. 2-3, the manually adjustable bracket 100 may comprise a first linear guideway 130 configured for manual movement in a first direction that is attached to the actuator 120 via the U-shaped mounting portion 102. Further, the manually adjustable bracket 100 may comprise a second linear guideway 150 coupled to the first linear guideway 130 that is configured to be attached to the fastener mechanism 110. In particular, the first linear guideway 130 may be configured for manual movement in the X-axis direction 132 (e.g., the first direction) whereas the second linear guideway 150 is configured for manual movement in the Y-axis direction 152 (e.g., the second direction). The X-direction 132 and the Y-direction 152 are planar to one another whereas the Z-direction (e.g., the third direction, shown in FIG. 1) of the actuator 120 is perpendicular to both the X-direction 132 and the Y-direction 152.

As will be described, the first and second linear guideways 130 and 150 are configured to be manually moved to a desired location and locked such that the fastener mechanism 110 is locked into the desired location to be moved by the vertical actuator 120 in the vertical Z-direction 121 for fastening a fastener to the work product 125. A first lock 134 may be connected to the first linear guideway 130 and a second lock 154 may be connected to the second linear guideway 150. In this way, the first and second linear gateways 130 and 150 may be manually locked by locking the locks 134 and 154. For example, this may be done by an operator. Alternatively, the movement of the first and second linear gateways 130 and 150 and the locking of the locks 134 and 154 may be remotely controlled by an electronic device under the control of an operator and/or a computing device.

In one embodiment of the invention, the manually adjustable bracket 100 is moveable in both the X-direction 132 and the Y-direction 152 such that an operator can move the fastener mechanism 110 to an exact location and can then secure the fastener mechanism 110 to that location by locking the locks 134 and 154 of the first and second linear guideways 130 and 150. Thus, the position of the fastener mechanism 110 is easily moveable (e.g., increased or decreased in either one or both of the X-direction 132 and/or Y-direction 152) by merely adjusting the positions of the first linear guideway 130 and the second linear guideway 150 and locking them into position.

Therefore, the manually adjustable bracket 100 may be designed to be moveable in both the X-direction 132 and the Y-direction 152 by the first and second linear guideways 130 and 150, respectively.

Looking at an example of the first linear guideway 130, the first linear guideway 130 may include a U-shaped mounting portion 102 that is mounted to the vertical actuator 120, as previously described. Further, first linear guideway 130 may include an approximately rectangular-shaped back plate 132 that is mounted to the U-shaped mounting portion 102 and that includes an approximately rectangular-shaped channel 136. An approximately rectangular-shaped slider 138 may be slideably mounted within the channel 136 of the base plate 132. The slider 138 of the first linear guideway 130 allows for movement in the X-direction 132.

The second linear guideway 150 may be connected to the first linear guideway 130 such that it moves in tandem with the first linear guideway 130 in the X-direction 132 and can also implement Y-direction movement 152 of the fastener mechanism 110, as will be described. The second linear guideway 150 may be connected to the slider 138 of the first guideway 130 by an approximately rectangular-shaped slide mount 160. The second linear guideway 150 may be part of the slide mount 160 or may be attached thereto.

In one embodiment, the second linear guideway 150 may include a protruding portion 162 that is connected to the slide mount 160 or that is part of the slide mount 160. The portion 162 may protrude perpendicularly from the slide mount and further include a rail 164 that extends therefrom. The rail 164 may be configured to slide within a channel 172 of a block 174 that is attached to the fastener mechanism 110.

Therefore, the block 174 that is attached to the fastener mechanism 110 is detachable from the rail 164 of the second linear guideway 150. In this way, different types of fastener mechanisms 110 that have blocks 174 attached thereto may be attachable to the rails 164 of manually adjustable brackets 100 such that a wide variety of different types of fastener mechanisms may be utilized in fastener assembly stations 115.

The second linear guideway 150 that provides for movement of the fastener mechanism 110 in the Y-direction 152 in one embodiment comprises two separate parts. One is the rail 164 attached to the protruding portion 162 and the other is the block 174 that is attached to the fastener mechanism 110, in which the block 174 of the fastener mechanism 110 can be moved freely along the rail 164. In particular, the fastener mechanism 110 via the block 174 may detach itself from the rail 164 and a wide variety of different fastener mechanisms 110 may be utilized. Therefore, operators can swap in and out different types of fastener mechanisms 110.

Once an operator has placed the fastener mechanism 110 into a desired location for the fastening of fasteners by the fastener mechanism 110 by moving the first linear guideway 130 in the X-direction 132 to the desired X-location and by moving the second linear guideway 150 in the Y-direction 150 to the desired Y-location, the operator may then lock these desired locations into place by locking the locks 134 and 154.

In one embodiment, each lock 134 or 154 includes a lever clamp 182 or 183 that when rotated compresses a split clamp lock 184 or 185 to a shaft 186 or 187, respectively. In particular, there is a Y-direction shaft 186 connected to the protruding portion 162 of the second linear guideway 150 that is received by the opening of the split clamp lock 184 of lever clamp 182 such that, with the rotation of lever clamp 182, the fastener mechanism 110 is locked into place in the Y-direction 152. In this way, once the second linear guideway 150 is set by an operator to an appropriate position in the Y-direction 152, lever clamp 182 may be rotated to compress the split clamp lock 184 to lock to the shaft 186 to thereby lock the second linear guideway 150 in a desired Y-direction 152 location On the other hand, the X-direction shaft 187 is mounted to the non-moving base plate 132 whereas the lever clamp 183 and the split clamp lock 185 are mounted to the moving slider mount 160 such that they move in the X-direction 132. Once the first linear guideway 130 is set by an operator to an appropriate location in the X-direction 132, lever clamp 183 may be rotated to compress the split clamp lock 185 to lock to the shaft 187 to thereby lock the first linear guideway 130 in a desired X-direction 132 location.

Conversely, when the lever clamps 182 and 183 are not compressed, then the first linear guideway 130 and second linear guideway 150 are free to move in the X-direction 132 and the Y-direction 152 until a desired location is achieved by an operator. Thereafter, as previously described, the fastener mechanism's 110 position can be locked into place by rotating the lever clamps 182 and 183. It should be appreciated that no hand tool needs to be involved. Thus, an operator can use his or her bare hands to turn the lever clamps 182 and 183 to lock and unlock the location of the fastener mechanism 110.

As previously described, the first linear guideway 130 and the second linear guideway 150 include a number of interconnected or coupled components. It should be appreciated that the components may be attached, connected, or coupled to one another by a wide variety of different means known to those of skill in the art, such as by: screws, rivets, bolts, plugs, molding, bonding, adhesives, etc. Also, it should be appreciated that the components of the previously described invention may be formed out of metallic or plastic materials. Further, although a particular type of locking mechanism has been described, it should be appreciated that a wide variety of different locking mechanism may be utilized.

Moreover, although the first linear guideway 130 and the second linear guideway 150 have been described as being moved and locked to particular locations for the positioning of the fastener mechanism 110 by an operator, it should be appreciated that this may also be accomplished by remote control under the control of a computing device alone and/or in cooperation with an operator.

Additionally, it should be appreciated that by using the previously-described manually adjustable bracket 100 that is movable in both the X-direction 132 and the Y-direction 152 with a removable fastener mechanism 110 in a fastener assembly station 115, that a wide variety of different types of fasteners mechanisms 110 may be switched in and out and positioned to preferred X-direction 132 and Y-direction 152 locations in a very time efficient and cost-effective manner. This provides a highly flexible assembly station to connect together components of a single product at the same or different locations or components of differing products at the same or different locations.

By providing the ability to quickly change the location of the fastener mechanism 110, embodiments of the invention provide for an easy update method for a fastener assembly station 115 to deal with new products and/or design changes in existing products that may occur rapidly—e.g., on a daily, weekly, or monthly basis. Therefore, aspects of the invention allow for the very flexible use of a fastener mechanism 110 in the manufacturing of products by allowing the fastener mechanism's location to be adjusted at the assembly station in a very time efficient and cost-effective manner.

While embodiments of the invention and their various mechanical, electromechanical, electrical, and functional components have been described in particular embodiments, it should be appreciated that the embodiments can be implemented with a wide variety of differing mechanical, electromechanical, electrical, and functional components, and combinations thereof. Further, although particular embodiments have been described as being employed for use with an assembly station and a fastener mechanism, the embodiments of the invention may be implemented with numerous other types of manufacturing devices and manufacturing processes to manufacture a wide variety of different types of devices.

What is claimed is:

1. A manually adjustable bracket moveable in first and second directions, wherein a fastener mechanism is attached to the manually adjustable bracket for use in a fastener assembly station that includes an actuator to move the fastener mechanism in a third direction to fasten fasteners to a work product, the manually adjustable bracket comprising:
   a first linear guideway configured for manual movement in the first direction and configured to be attached to the actuator;
   a second linear guideway coupled to the first linear guideway and configured for manual movement in the second direction and configured to be attached to the fastener mechanism; and
   a lock coupled to at least one of the first or second linear guideways, the lock comprising a lever clamp that, when rotated, compresses a split clamp lock to a shaft, wherein the first and second linear guideways are configured to be manually moved to a desired location and locked such that the fastener mechanism is locked into the desired location to be moved by the actuator in the third direction for fastening fasteners to the work product, and wherein the first or second linear guideway is manually locked by locking the lock.

2. The manually adjustable bracket of claim 1, wherein the first and second directions are planar and the third direction is perpendicular to the first and second directions.

3. The manually adjustable bracket of claim 1, wherein the first linear guideway comprises a slider configured to slide within a channel of a plate attached to the actuator.

4. The manually adjustable bracket of claim 1, wherein the second linear guideway comprises a rail configured to slide within a channel of a block attached to the fastener mechanism.

5. The manually adjustable bracket of claim 4, wherein the block is detachable from the rail.

6. The manually adjustable bracket of claim 5, wherein different types of fastener mechanisms that include the block are attachable to the rail.

7. The manually adjustable bracket of claim 1, wherein the fastener mechanism is a screw driver.

8. The manually adjustable bracket of claim 1, wherein the work product is a disk drive.

* * * * *